United States Patent [19]
Nye, Jr. et al.

[11] 3,854,058
[45] Dec. 10, 1974

[54] TEMPERATURE STABLE ONE-SHOT MULTI-VIBRATOR

[75] Inventors: Dudley D. Nye, Jr.; Peter J. Carlson; Arley Keith, Jr., all of Fort Lauderdale, Fla.

[73] Assignee: Airpax Electronics Inc., Fort Lauderdale, Fla.

[22] Filed: Sept. 5, 1973

[21] Appl. No.: 394,410

[52] U.S. Cl. .................. 307/273, 307/310
[51] Int. Cl. .................................. H03k 3/10
[58] Field of Search ......... 307/273, 310; 328/207

[56] References Cited
UNITED STATES PATENTS

| | | | |
|---|---|---|---|
| 2,976,432 | 3/1961 | Geckle, Jr. | 307/273 |
| 3,025,417 | 3/1962 | Campbell, Jr. | 307/273 |
| 3,320,551 | 6/1967 | Miller | 307/273 |
| 3,389,273 | 6/1968 | Haines | 307/273 |
| 3,502,912 | 3/1970 | McAvoy | 307/273 |
| 3,644,757 | 2/1972 | Rezek et al. | 307/273 |
| R26,036 | 6/1966 | Rywak | 307/273 |

OTHER PUBLICATIONS

"A Delay CKT with Monostable & Bistable Properties", by Lewis In Electronic Engineering, June 1970, Page 85.

*Primary Examiner*—Stanley D. Miller, Jr.
*Attorney, Agent, or Firm*—LeBlanc & Shur

[57] ABSTRACT

Disclosed are temperature compensated one-shot multivibrator circuits particularly adapted for use in industrial tachometers. The one-shots have compensating diodes or transistor junctions in the collector circuits of the timing transistors. In some of the circuits the junctions are matched to insure equal current flow through both the compensated and compensating junctions. They produce pulses have a pulse width that is substantially constant over a wide temperature range.

15 Claims, 6 Drawing Figures

PATENTED DEC 10 1974                                3,854,058

TEMPERATURE STABLE ONE-SHOT MULTI-VIBRATOR

This invention relates to one-shot multi-vibrators and more particularly to multi-vibrators of this type having substantially zero temperature coefficient.

One-shot multi-vibrators are frequently used in industrial tachometers. These are devices which sense the speed of a rotating shaft by counting gear teeth to produce an electrical output indicative of, for example, rotational speed. Each time a gear tooth coupled to the rotating shaft passes a sensing head an electrical pulse is produced and this series of pulses is converted in the tachometer to a DC electrical signal indicative of pulse frequency and therefore the rotational speed of the shaft. A one-shot multi-vibrator frequently forms an important component of the pulse-to-DC converter of the tachometer and is used to convert a series of random width and height pulses into a train of standard pulses having a constant volt-second area so that the average DC output signal is directly proportional to the frequency of the input trigger pulses.

As is well known transistor circuits tend to vary in operation with changes in temperature. Since an average output signal directly proportional to the input frequency as required by one-shot tachometer operation requires a constant volt-second area involving control of both pulse height and pulse width it is necessary to introduce into a transistor circuit of this type some form of temperature compensation. While various arrangements have been proposed in the past, none have proved to be completely satisfactory.

Because of variations in the pulse width in the output of previous transistor one-shot multi-vibrators, it has been customary to use the multi-vibrator in combination with a temperature dependent zener diode which zener diode is used to control the pulse height to compensate for changes in pulse width. However, it has been found difficult to obtain compensating zener diodes having a specific temperature coefficient over a desired range of temperatures.

In the present invention, the pulse width output of the one-shot multi-vibrator is kept constant by using diodes and/or transistors as temperature compensating elements in the circuit. More specifically, diode drops are incorporated in the collector circuits of the multi-vibrator transistors and these are arranged to insure equal currents both in the junctions to be compensated and in the diode drops used for compensation. As a result of the essentially zero variation in pulse time or pulse width of the output of the one-shot multi-vibrator of the present invention, it can be used with a readily avilable zero temperature coefficient zener diode to maintain a constant volt-second area output for the tachometer independent of temperature over a wide temperature range.

While the invention will be described in conjunction with a temperature compensated one-shot usable in industrial tachometers, it is understood that the multi-vibrators of the present invention may be used not only for highly accurate frequency to DC conversion in tachometers but can be used in computers and digital systems and wherever a one-shot multi-vibrator having an output with a very stable pulse duration is desired.

It is therefore one object of the present invention to provide an improved temperature stable one-shot multi-vibrator.

Another object of the present invention is to provide a one-shot multi-vibrator which produces an output pulse having a pulse width that does not change with temperature.

Another object of the present invention is to provide a relatively simplified and inexpensive temperature compensated transistor one-shot multi-vibrator.

Another object of the present invention is to provide a transistor multi-vibrator having diode drops in the transistor collector circuits with the diode drops arranged to insure both equal current in the transistor junctions to be compensated and in the diodes or transistors used for compensation.

These and further objects and advantages of the invention will be more apparent upon reference to the following specification, claims and appended drawings wherein:

Figure 1:
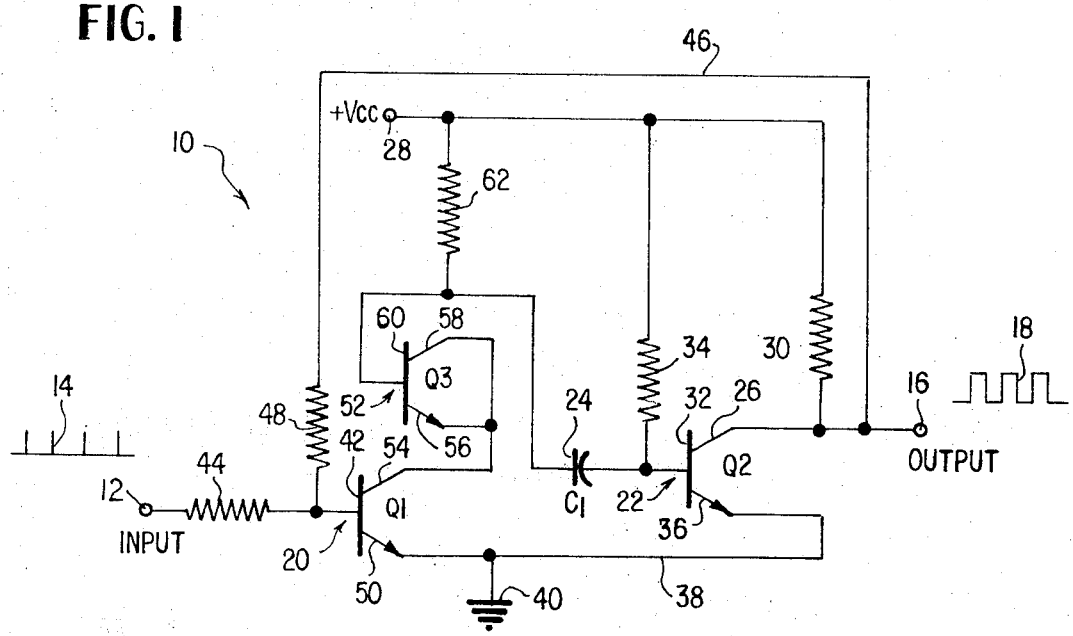
FIG. 1 is a circuit diagram of a simplified one-shot multi-vibrator constructed in accordance with the present invention.

Referring to the drawings, FIG. 1 shows a one-shot multi-vibrator in accordance with the present invention generally indicated at 10. The multi-vibrator has an input terminal 12 adapted to receive a series of electrical input pulses generally illustrated by the pulse train 14. By way of example only these pulses may be generated by an electrical sensing head positioned adjacent the teeth of a rotating gear so that as each gear tooth passes the sensing head, one of the electrical pulses 14 is produced. One-shot multi-vibrator 10 includes an output terminal 16 at which appears a series of electrical output pulses indicated by the output train 18. The leading edge of each pulse 18 coincides with a corresponding input pulse 14 but the width of the output pulses 18 is constant and does not vary materially with temperature over a rather large temperature range.

One-shot 10 in FIG. 1, comprises a first NPN junction transistor at 20 labelled Q1 and a second NPN junction transistor 22 labelled Q2 interconnected by a timing capacitor 24 labelled C1. Transistor 22 (Q2) has its collector 26 connected to a positive DC power supply terminal 28 through a resistor 30 and the base 32 of transistor 22 is connected to the positive side of the power supply through a timing resistor 34. The emitter 36 of the transistor is returned to the opposite side of the DC power supply by way of a lead 38 and the DC ground connection 40.

Input terminal 12 of multi-vibrator 10 is connected to the base 42 of transistor 20 (Q1) through an input resistor 44. The other cross-connection for the multi-vibrator is from the output terminal 16 by way of a lead 46 to the base 42 through a resistor 48. Emitter 50 of transistor 20 is connected to ground.

A temperature compensating transistor 52 labelled Q3 is connected to the collector 54 of transistor 20. Transistor 52 (Q3) has its emitter 56 and collector 58 connected together to collector 54. Its base 60 is connected to a capacitor 24 (C1) and to the positive side of the power supply at terminal 28 through a resistor 62.

The circuit 10 of FIG. 1 is a one-shot multi-vibrator with a transistor Q3 connected as a diode in the collector circuit of transistor Q1. When transistor Q1 clamps to ground the timing capacitor C1 is held off of ground by one diode drop. The capacitor charges during the timing period until the voltage-base-to-ground on transistor Q2 is approximately 0.6 volt or one diode drop. At this point the circuit switches to end the timing period. Since the timing period started with reverse voltage from base-to-ground on Q2 equal to the charge on the capacitor less the voltage drop across the compensating transistor Q3, and ends up at one diode drop above ground, the timing is not materially affected by temperature. When the base-to-emitter of Q2 increases with temperature trying to make the timing pulse longer, the voltage drop across the Q3 diode also increase to compensate for temperature.

Figure 2:
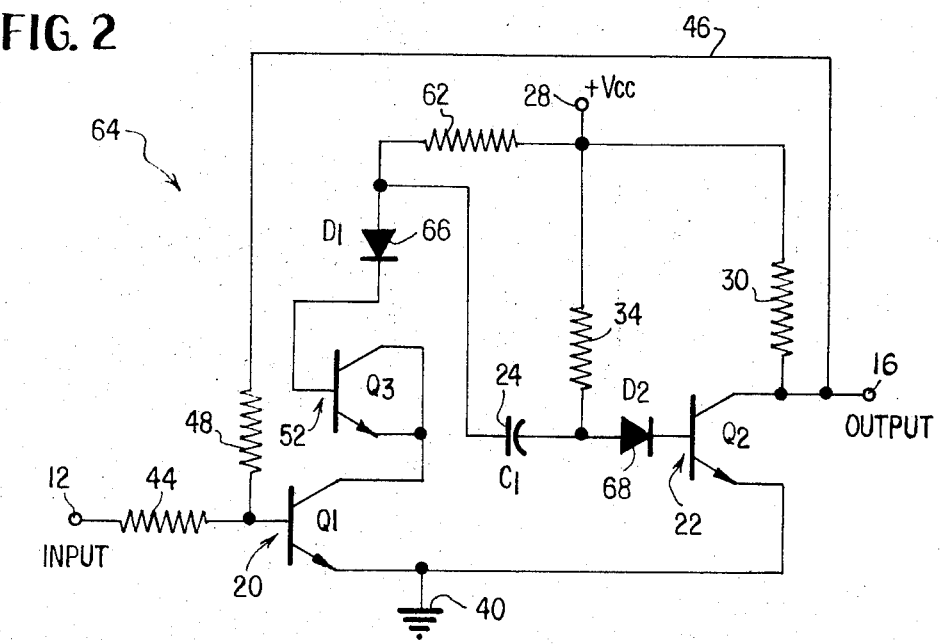
FIG. 2 is a circuit diagram of a modified one-shot multi-vibrator similar to that of FIG. 1.

FIG. 2 shows a modified construction in which like parts bear like reference numerals. The modified one-shot multi-vibrator in FIG. 2 generally indicated at 64 is similar to the multi-vibrator 10 of FIG. 1 except that the multi-vibrator 64 of FIG. 2 has added to it a pair of rectifier diodes 66 and 68 labelled D1 and D2 respectively. Diode 66 is connected between resistor 62 and the base of compensating diode transistor 52 and the second rectifier diode 68 is connected between capacitor 24 and the base of transistor 22 (Q2). In this circuit, diode 68 is provided in the base circuit of transistor Q2 to permit the utilization of a higher collector supply voltage without exceeding the reverse breakdown voltage of the Q2 base-to-emitter junction. Two diode drops must be used in the Q1 transistor collector to compensate for two diode drops in the Q2 transistor base circuit and this is done by the addition of diode 55 (D1). The other diode drop in this circuit is the base-to-emitter transistor junction of transistor 52 (Q3). The collector circuit of Q1 thus utilizes a transistor junction and a diode to temperature compensate for a diode and transistor junction in the Q2 base circuit.

Figure 3:
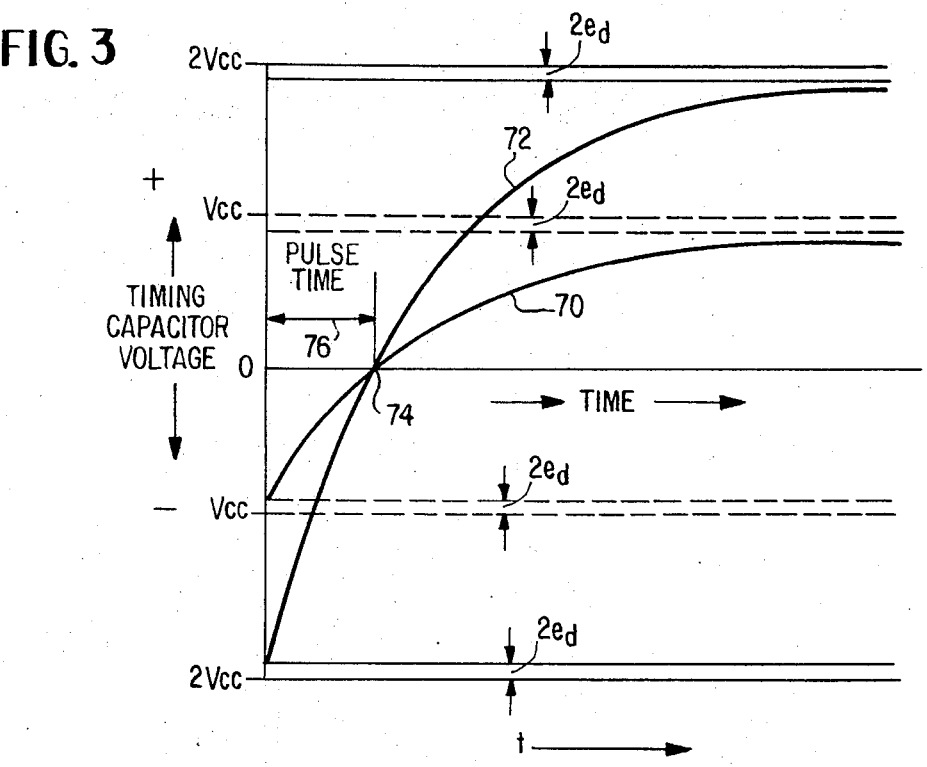
FIG. 3 is a voltage waveform showing the multi-vibrator timing capacitor voltage.

The addition of two diode drops $e_d$ to compensate for the two diode drops on the output circuit provides almost perfect power supply compensation with respect to output pulse time. This is illustrated by the two curves in FIG. 3 labelled 70 and 72. FIG. 3 is a plot of timing capacitor voltage as a function of time and these two curves show that the pulse time is independent of the Vcc power supply voltage in the embodiment of FIG. 2. Curve 70 shows the voltage swing from a minus ($Vcc-2e_d$) to plus ($Vcc-2e_d$) and curve 72 illustrates the voltage swing when the power supply voltage has doubled. Both curves pass through the zero voltage level at point 74 to define the same pulse time illustrated by the double-ended arrow 76. Thus, the switch point occurs at the 50 percent point with respect to the apparent exponential voltage swing on the timing capacitor. The time to charge 50 percent of the total swing is always the same regardless of the power supply voltage Vcc.

Figure 4:
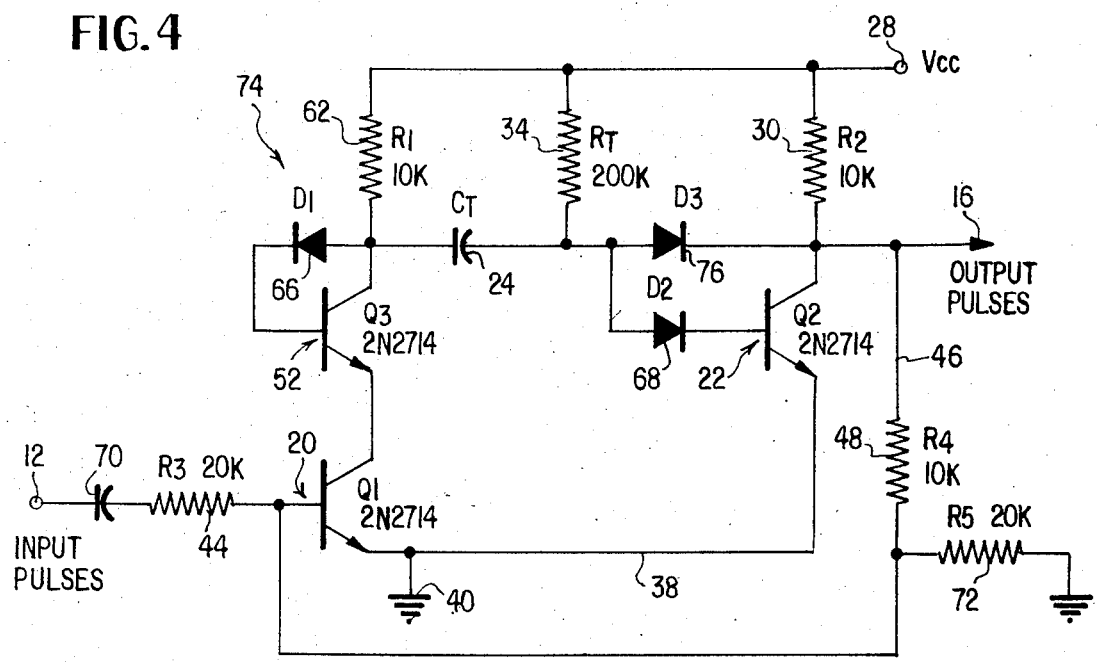
FIG. 4 is a circuit diagram of a further modified temperature compensated one-shot in accordance with the present invention.

FIG. 4 shows another modified embodiment with like parts bearing like reference numerals. This embodiment is similar to that of FIG. 2 but includes an input capacitor 70 and a grounding resistor 72. Typical component values are illustrated in FIG. 4. More importantly, the multi-vibrator generally indicated at 74 in FIG. 4 differs from the multi-vibrator 64 of FIG. 2 in that it includes a third rectifier diode 76 connected to the collector of transistor 22 (Q2). This diode is added to make the other diodes and the base-emitter junction involved in the timing have the same current. The degree of compensation is improved by controlling the current in diode 68 and the base current in transistor 22. By the use of the third diode 76, the current into the base of Q2 through diode 68 is kept the same as the current in diode 66 and the base of transistor Q3. The circuit of FIG. 4 works as follows:

1. Diode 76 prevents transistor Q2 from saturating. The collector current of Q2 ≈ Vcc/R2, then the base current and current through diode 68 is $Vcc/(R1 \times h_{FE})$ where $h_{FE}$ is the transistor current gain and Vcc is the power supply voltage.

2. Since Q3 is prevented from saturating by diode 66, its base current is also approximately equal to $Vcc/(R1 \times h_{FE})$.

3. Under these conditions, the currents in diode 66, diode 68 and the base-emitter of Q3 and Q2 are all equal. This optimizes the temperature compensating characteristics of diode 66 and transistor Q3, when compensating for the temperature effects of the one-shot pulse time, due to the temperature effect of diode 68 and the Q2 emitter-base junction. In addition to improving the temperature compensation, the use of the added diode 76 in preventing transistor Q2 from saturating enhances the frequency capabilities of the one-shot circuit (Q3 is also prevented from saturating by diode 66).

Figure 5:
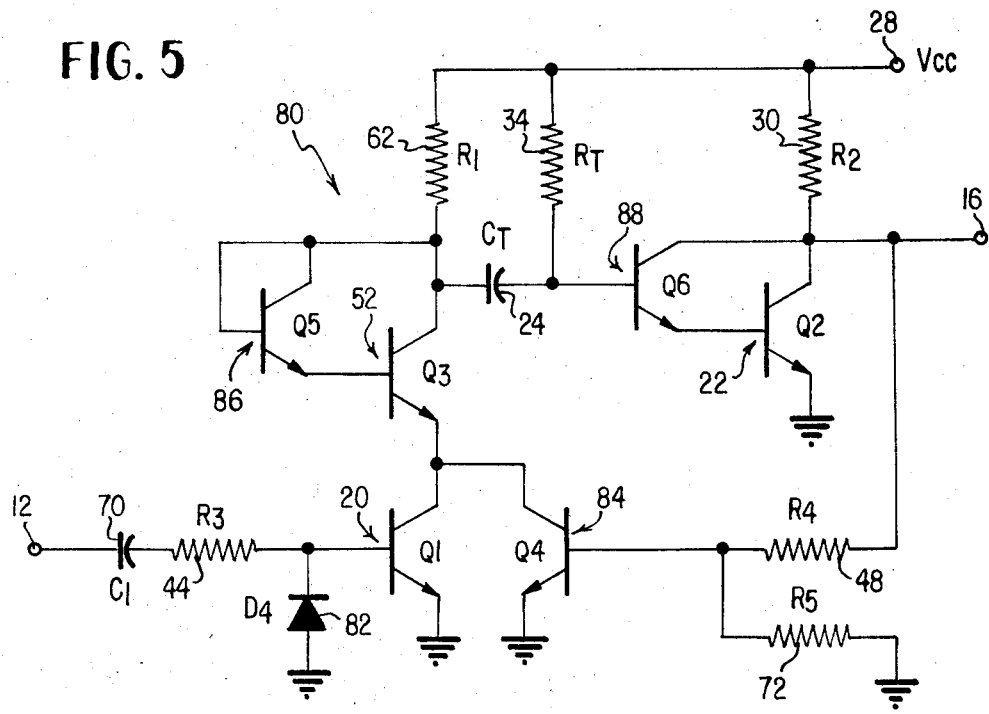
FIG. 5 shows a further modified construction.

FIG. 5 shows a further modification of a temperature compensated one-shot multi-vibrator constructed in accordance with the present invention. While similar to the embodiments previously described, the embodiment of FIG. 5 is particularly adapted for applications requiring relatively long time durations such as occur when used in low speed tachometers for detecting speeds of from 0 to 5 revolutions per minute. That is, in previous one-shots incorporating large timing resistors, the large timing resistors tend to starve the output transistor creating slow fall times and therefore timing instability. In order to avoid this slow speed tachometers have made use of a more complicated two-shot arrangement to double the input frequency. This places restrictions on the input signal symmetry. These problems can be avoided in low speed tachometers by incorporating the one-shot circuit of FIG. 5 generally indicated at 80 wherein like parts again bear like reference numerals. Multi-vibrator 80 of FIG. 5 is similar to the multi-vibrator 74 of FIG. 4 except that a rectifier diode 82 is connected to the base of input transistor 20 and feedback to this transistor as through an NPN junction transistor 84 labelled Q4. The important differences between the circuits of FIG. 4 and 5 are that in FIG. 5 diodes 66, 68 and 76 of FIG. 4 are replaced by two more NPN junction transistors 86 and 88 labelled Q5 and Q6 respectively. The incorporation of these transistors makes possible a larger timing resistor 34 ($R_T$).

The operation of the circuit in FIG. 5 is as follows. With transistor Q1 off the left side of timing capacitor 24 is at plus Vcc and the right side at approximately + 1.2 volt. This is because current through timing resistor 34 drives transistor Q6 until it saturates. With transistor Q6 saturated, the base-emitter diode (Q6 BE) and the collector-base diode (Q6 CB) perform the same functions as do diodes 68 and 76 in FIG. 4. That is diode Q6 CB prevents saturation of Q2. If the collector current of Q2 is approximately Vcc/R2 then the base current Q2 ≈ Vcc/(R2 × $h_{FE}$) ≈ diode Q6 BE current. When transistor Q1 turns on because of a signal to its base, transistor Q3 is forced on but is prevented from saturating by transistor Q5. Transistor Q5 replaces the diode 66 of FIG. 4. This transistor is substituted for the diode to prevent mismatch between the diode drop Q5 (BE) and Q6 (BE). Then the collector current of Q3 ≈ Vcc/R1 = Vcc/R2 = IC (Q2). Also, since Q3 is prevented from saturating $I_B$ (Q3) = Vcc/(R1 × $h_{FE}$) = $I_B$ (Q6).

Perfect temperature compensation and supply voltage compensation is attained when transistor Q3 matches transistor Q2 in VBE (ON) drop and $h_{FE}$, and when transistor Q5 base emitter drop (ON) matches Q6 base emitter drop (ON). Therefore, transistors Q3 and Q2 are the same type as are transistors Q5 and Q6. For the same reason R1 = R2. These matching characteristics are, however, not at all critical and analysis shows that a mismatch of 100 microvolt/degree centigrade (a very large mismatch) produces approximately 0.0004 percent /degree centrigrade shift in a one-shot using a 15 volt source for Vcc.

Figure 6:
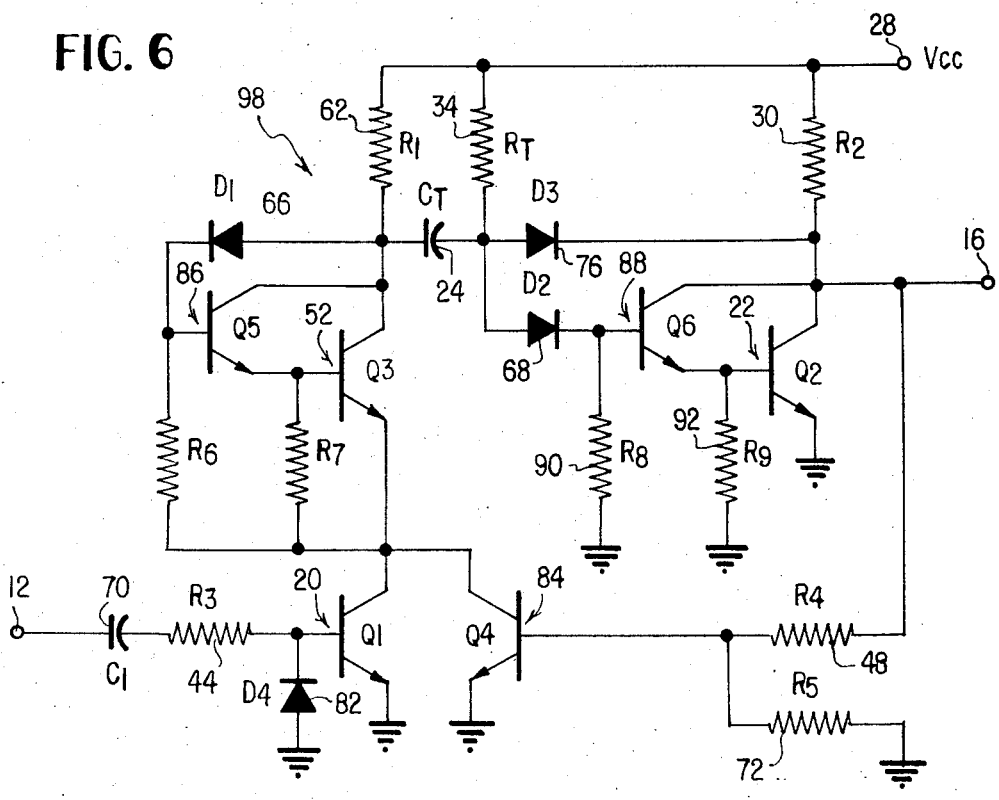
FIG. 6 shows a further temperature compensated one-shot multi-vibrator constructed in accordance with this invention.

FIG. 6 shows a further modification similar to the one-shot of FIG. 5 but the circuit of FIG. 6 permits operation at higher temperatures and at higher supply voltages. Operation at higher supply voltages, i.e., where Vcc is from about 10 to 50 volts is desirable to minimize effects of diode-transistor mismatches.

As can be seen in FIG. 6, transistors Q2 and Q6 form an output Darlington pair and these are matched by the input Darlington pair comprising transistors Q3 and Q5. This permits a very large timing resistor 34 (RT) while at the same time retaining the essentially zero temperature coefficient characteristics of the previously described constructions.

In FIG. 6 the Darlington pairs are matched by the diodes 66, 68 and 76 in the same manner as in the embodiment of FIG. 4. In addition to the Darlington pairs, FIG. 6 includes another pair of resistors 90 and 92 labelled R8 and R9 respectively which are provided to prevent turn on of transistors Q6 and Q2 by leakage currents when operated at high temperature. The currents in the components are matched as before, that is IC (Q2) = IC (Q3) because transistor type Q3 = transistor type Q2 and transistor type Q5 = transistor type Q6. The diodes D1 and D2 are also of the same type and matched. In addition resistor R7 = resistor R9 and resistor R6 = resistor R8. Therefore, as before, VCE (ON) of Q3 = V (ON) at junction 94 in FIG. 6 which is the basic requirement for temperature compensation of the one-shot 98 of FIG. 6 and immunity from supply voltage variations.

It is apparent from the above that the present invention provides a simplified and inexpensive transistor one-shot multi-vibrator which produces an output pulse having a width which is substantially independent of variations in temperature over a relatively wide temperature range. This one-shot when combined with a zero temperature coefficient zener diode can be used in a frequency to DC converter of the type conventionally employed in industrial tachometers to produce output pulses having a substantially constant volt-second area. The substantially zero temperature coefficient is provided in multi-vibrators which may be used for both low speed and high speed tachometer applications. Important features of the present invention include a simplified and inexpensive transistor construction including diode drops in the transistor collector circuits in conjunction with arrangements which ensure equal current not only in the junctions being compensated but also in the diode junctions used for compensation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States letters Patent is:

1. A one-shot multi-vibrator comprising first and second transistors each having an emitter, a collector, and a base, a pair of power supply terminals for coupling a DC power supply across the emitter-collector circuits of said transistors, means for supplying an input signal to the base of the first of said transistors, means for deriving an output signal from the collector of the second of said transistors, a timing capacitor coupled between the collector of said first transistor and the base of said second transistor, a resistor coupling the collector of said second transistor to said first transistor, a timing resistor coupling one of said power supply terminals to the base of said second transistor, means providing a semi-conductor diode junction coupling said timing capacitor to the collector of said first transistor, a first semi-conductor diode junction coupling one side of said timing capacitor to the base of said second transistor and second and third semiconductor diode junctions coupling the other side of said timing capacitor to the collector of said first transistor, and a fourth semiconductor diode junction coupling said one side of said timing capacitor to the collector of said second transistor.

2. A one-shot according to claim 1 wherein all of said diode junctions are formed by transistors.

3. A one-shot according to claim 2 wherein at least two of said junctions are formed by a Darlington circuit.

4. A one-shot according to claim 3 wherein all of said junctions are formed by a pair of Darlington circuits.

5. A one-shot according to claim 1 wherein at least one of said diode junctions is formed by a transistor.

6. A one-shot according to claim 1 wherein one of said diode junctions is formed by a transistor and the remainder are formed by rectifier diodes.

7. A one-shot multi-vibrator comprising first and second transistors each having an emitter, a collector and a base, a pair of power supply terminals for coupling a DC power supply across the emitter-collector circuits of said transistors, an input terminal coupled to the base of the first of said transistors, an output terminal coupled to the collector of the second of said transistors, a timing capacitor coupled between the collector of said first transistor and the base of said second transistor, a resistor coupling the collector of said second transistor to said first transistor, a timing resistor coupling one of said power supply terminals to one side of said timing capacitor, a first diode coupling said one side of said capacitor to the base of said second transistor, a second diode coupling said one side of said capacitor to the collector of said second transistor, a third transistor having an emitter, collector and base coupling the other side of said timing capacitor to the collector of said first transistor, and a third diode coupled between the collector and base of said third transistor.

8. A one-shot according to claim 7 wherein said transistors are all NPN junction transistors.

9. A one-shot according to claim 7 wherein said diodes are all of the same type and said transistors are all of the same type so that the currents flowing through them are matched.

10. A one-shot according to claim 7 wherein at least one of said second and third transistors forms part of a Darlington circuit.

11. A one-shot according to claim 7 wherein said second transistor comprises part of a first Darlington pair and said third transistor forms part of a second Darlington pair.

12. A one-shot according to claim 7 wherein the emitter of said third transistor is coupled to the collector of said first transistor.

13. A one-shot according to claim 12 including a pair of matched resistors coupling said one power supply terminal to the collectors of said second and third transistors.

14. A one-shot according to claim 7 including a fourth transistor coupling the collector of said second transistor to said first transistor.

15. A one-shot according to claim 14 including a fifth transistor coupled in the collector-base circuit of said third transistor and a sixth transistor coupled in the collector-base circuit of said second transistor.

* * * * *